United States Patent [19]

Volk

[11] Patent Number: 5,423,720
[45] Date of Patent: Jun. 13, 1995

[54] LEG RETAINER FOR HALVES OF POULTRY

[75] Inventor: Daniel J. Volk, Alpharetta, Ga.

[73] Assignee: Volk Enterprises, Inc., Turlock, Calif.

[21] Appl. No.: 254,316

[22] Filed: Jun. 6, 1994

[51] Int. Cl.6 .............................................. A22C 21/00
[52] U.S. Cl. ..................................... 452/174; 452/176
[58] Field of Search ............................... 452/174, 176

[56] References Cited

U.S. PATENT DOCUMENTS

| | | | |
|---|---|---|---|
| 1,255,477 | 2/1918 | Smart | 452/176 |
| 2,127,623 | 8/1938 | Weil | 452/176 |
| 2,722,712 | 11/1955 | Rabe | 452/176 |
| 4,056,865 | 11/1977 | Cloyd | 452/176 |
| 5,102,370 | 4/1992 | Volk | 452/174 |
| 5,112,274 | 5/1992 | Volk | 452/174 |
| 6,181,880 | 1/1993 | Volk | 452/174 |

*Primary Examiner*—Willis Little
*Attorney, Agent, or Firm*—Flehr, Hohbach, Test, Albritton & Herbert

[57] ABSTRACT

A leg retainer for use with a half of a body of eviscerated poultry having a leg with a hock. The leg retainer comprises a unitary substantially coplanar thin plastic member which includes a first hook portion adapted for attachment to the body and a second hook portion adapted for hooking the leg. A connector joins the first hook to the second hook. The plastic member serves to pull the leg close to the body.

19 Claims, 2 Drawing Sheets

LEG RETAINER FOR HALVES OF POULTRY

BACKGROUND OF THE INVENTION

1. Field of the Invention

This invention relates in general to a new leg retainer or truss for poultry or fowl and pertains, more specifically, to a retainer for securing a leg of a small fowl during processing, shipping and cooking.

2. Prior Art

Halves of eviscerated poultry such as chicken are being made available for cooking. Since chicken legs tend to loosen during cooking, it is often the practice to secure the leg of the chicken close to the body to provide uniformity amongst the chicken halves and facilitate packaging and cooking. The current practice is to secure the chicken leg with string. Unfortunately, the installation of the string is labor intensive. In addition, the string is often difficult to detect after the chicken half has been cooked and, as a result, is eaten by the consumer.

Accordingly, a primary object of the present invention is to provide a retainer for use with half of a body of eviscerated poultry to secure a leg to the half body during shipping and cooking.

Another object of the invention is to provide a retainer of the above character which is suitable for use with small poultry such as chicken.

Another object of the invention is to provide a retainer of the above character which can be easily attached to the chicken body.

Another object of the invention is to provide a retainer of the above character which attaches to the chicken leg behind the hock.

Another object of the invention is to provide a retainer of the above character which can attach to either the meat or bone structure of the chicken.

SUMMARY OF THE INVENTION

In general, the invention consists of a leg retainer for use with a half of a body of eviscerated poultry having a leg with a hock. The leg retainer comprises a unitary substantially coplanar thin plastic member which includes a first hook portion adapted for attachment to the body and a second hook portion adapted for hooking the leg. A connector joins the first hook portion to the second hook portion. The plastic member serves to pull the leg close to the body.

BRIEF DESCRIPTION OF THE DRAWINGS

The accompanying drawings, which are incorporated in and form a part of this specification, illustrate several embodiments of the invention and, together with the description, serve to explain the principles of the invention.

DETAILED DESCRIPTION OF THE PREFERRED EMBODIMENTS

Figure 1:
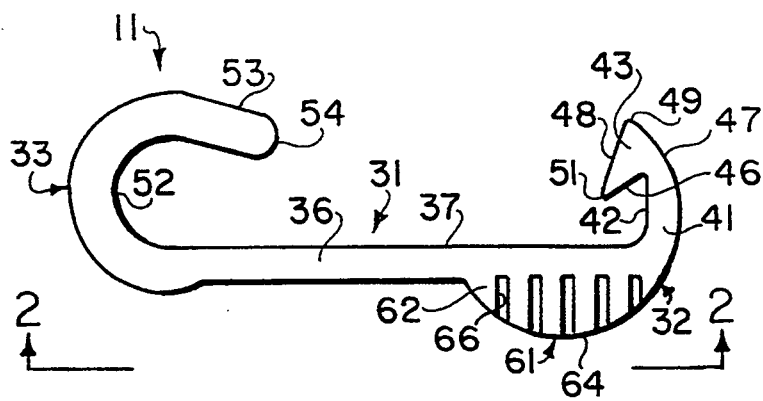
FIG. 1 is top plan view of the leg retainer of the present invention.

Reference will now be made in detail to the preferred embodiments of the invention, examples of which are illustrated in the accompanying drawings. While the invention will be described in conjunction with the preferred embodiments, it will be understood that the invention is not limited to those embodiments. On the contrary, the invention is intended to cover alternatives, modifications and equivalents, which may be included within the spirit and scope of the invention as defined by the appended claims.

Turning now to the drawings, wherein like components are designated by like reference numerals throughout the various figures, attention is directed to FIGS. 1 through 6 where one embodiment of the invention is illustrated.

Figure 3:
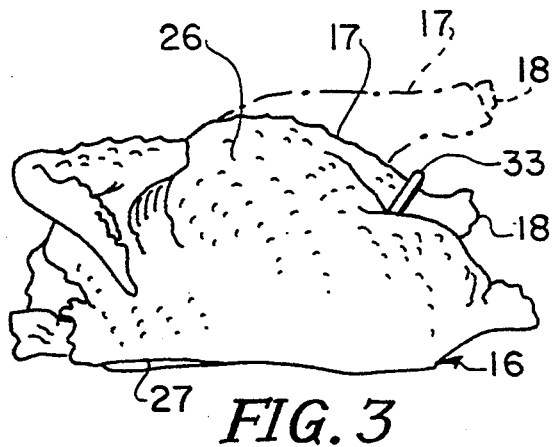
FIG. 3 is a side elevational view of the outside of a half chicken with the leg retainer of FIG. 1 in position thereon.
Figure 4:
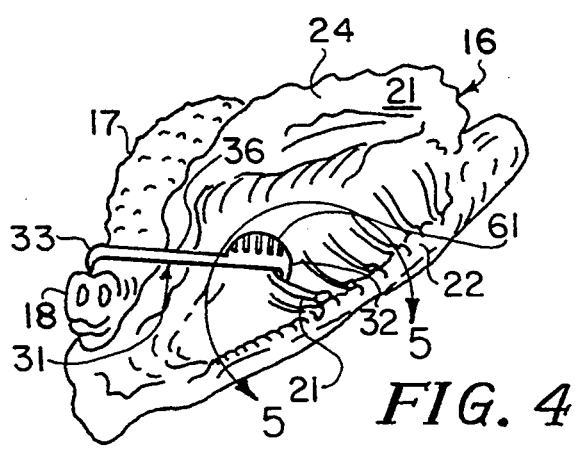
FIG. 4 is a side elevational view of the inside of a half chicken with the leg retainer of FIG. 1 in position thereon.

Poultry leg truss or retainer 11 of the present invention is for use with a half of a carcass or body 16 of eviscerated poultry such as a chicken having a drumstick or leg 17 with an exposed knuckle or hock 18 (see FIGS. 3 and 4). Body half 16 includes an inner side 21 with a portion of bone structure 22, including ribs 23, being exposed. Meat 24 of the chicken is carried by bones structure 21. Body half 16 has an outer side 26 which includes skin 27 overlying meat 24.

Figure 2:
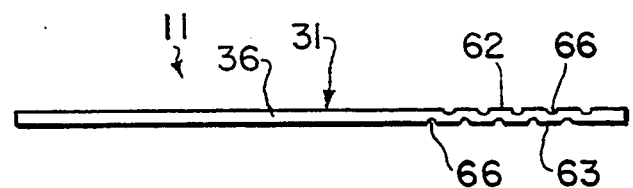
FIG. 2 is a side elevational view of the leg retainer of FIG. 1 taken along the line 2—2 of FIG. 1.

Leg retainer 11 is made from a unitary thin member 31 formed from any suitable material such as plastic and preferably injection molded out of nylon. Plastic member 31 is sized for use with a chicken and has a length ranging from approximately 2.5 to 5.0 inches and preferably approximately 3.4 inches. The plastic member has a width of approximately 0.06 inch so as to be substantially rigid and, as illustrated in FIG. 2, is substantially coplanar. Elongate member 31 is formed with a first hook means or portion in the form of body hook 32 which is adapted for attachment to body half 16 and a second hook means or portion in the form of leg hook 33 which is adapted for hooking about leg 17 of the body half (see FIG. 1). Hooks 32 and 33 are joined by an elongate straight member or connector 36 which extends in a direction parallel to the longitudinal axis of retainer 11 and has an inner surface or side 37.

Body hook 32 can attach to either meat 24 or bone structure 22. In this regard, the body hook has a first or extension portion 41 formed in part by a inner first straight surface or side 42 extending from connector inner side 37 at a right angle. The body hook also has a second or hooking portion 43 formed in part by an inner second straight surface or side 46 which extends from first straight side 42 at an acute angle ranging from 40° to 70° and preferably approximately 55° toward connector inner side 37. In this manner, first and second straight sides 42 and 46, together with connector inner side 37, form the inside of body hook 32. Extension portion 41 and hooking portion 43 further include an outer surface or side 47 which extends arcuately from the end of connector 36 toward leg hook 33. A straight surface or side 48 extends between arcuate outer side 47 and connector inner side 37, meeting outer side 47 at first pointed end or tip 49 and second straight side 46 at second pointed end or tip 51. Sides 48 and 46 meet at an angle of approximately 40°.

Leg hook 33 has a size and shape for securing to leg 17 of body half 16 behind or adjacent hock 18. The leg hook extends from connector 36 in the same direction as body hook 32 and includes an inner arcuate surface or side 52 having a radius ranging from approximately 0.25 to 1.00 inch and preferably approximately 0.30 inch. The leg hook subtends an angle ranging from approximately 90° to 120° and preferably approximately 105° and has a straight end portion 53 which has a length of approximately 0.5 inch and terminates in a blunt end 54. Connector 36 is longitudinally sized so that the distance between first straight side 42 of body hook 32 and the inside of leg hook 33 is approximately three inches and blunt end 54. The connector has a width of approximately 0.16 inches.

Plastic member 31 is formed with a tab portion 61 for gripping during installation of leg retainer 11. Tab portion 61 extends from connector 36 in an opposite direction from body and leg hooks 32 and 33 and is formed from opposite first and second parallel surfaces 62 and 63. The tab portion is formed adjacent body hook 32 and has an arcuate outer side 64 which is an extension of outer side 47 of the body hook. At least one of planar surfaces 62 or 63, and as shown in FIG. 2 both surfaces 62 and 63, is formed with anti-slip means in the form of longitudinally spaced-apart parallel grooves 66 which extend at right angles to the connector. These grooves are offset from each other so as not to weaken tab portion 61.

In operation and use, leg retainer 11 is used for holding leg 17 close to body half 16 during shipping and handling of the chicken. The retainer of the present invention is attached to body half 16 by an installer gripping opposite surfaces 62 and 63 of tab portion 61 with the fingers of the hand. Grooves 66 serve as finger grips to facilitate this gripping. The tactility of surfaces 62 and 63 is particularly useful when the leg retainer is gripped by gloved and/or greased hands so that the sensitivity of the fingers has been diminished. Leg hook 33 is looped around leg 17 between hock 18 and meat 24 of the leg. The leg hook has a contour which generally conforms to the bone of leg 17 and is internally sized so as to fit relatively snugly about the leg and skin 27 thereover. As such, the leg hook does not ride up on either meat 24 or hock 18. Plastic member 31 is positioned relative to body half 16 so that connector 36 extends along inner side 21 of body half 16 and leg hook 33 loops around the body half to outer side 26 thereof. The placement of tab portion 61 away from leg hook 33 facilitates the attachment of the leg hook to the chicken and also facilitates securing body hook 32 of the leg retainer to body half 16 of the chicken.

Figure 5:
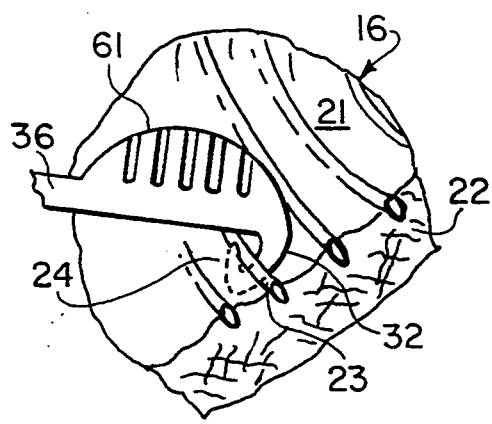
FIG. 5 a fragmentary view of the leg retainer of FIG. 1 taken along the line 5—5 of FIG. 4.

Once the installer has pulled leg 17 snugly against outer side 26 of the chicken, plastic member 31 is pulled tightly against inner side 21 and body hook 32 positioned around a rib 23 as illustrated in FIG. 5. Pointed tip 49 serves to pierce any meat 24 or other tissue for placement of the body hook around the rib and pointed tip 51 facilitates placement of hooking portion 43 about the rib. The outwardly extending tab portion 61 makes easy the pushing of plastic member 31 snugly against inner side 21 of the chicken. The inward inclination of second straight side 46 acts as a hooking surface which precludes plastic member 31 from pulling outwardly away from inner side 21 of the chicken once the installer has released leg retainer 11. First and second straight sides 42 and 46 are sized so that body hook 32 fits snugly about a rib of a standard sized chicken.

Figure 6:
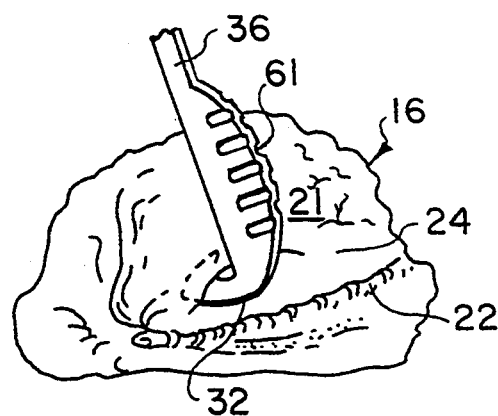
FIG. 6 is a fragmentary view similar to FIG. 5 of the leg retainer of FIG. 1 showing another means for attaching the leg retainer to a half chicken.

It should be appreciated that body hook 32 can secure to meat 24 of body half 16, as shown in FIG. 6, and be within the scope of the present invention. In this regard, pointed tip 49 is particularly suited for piercing the meat to embed tip 51 therein. The anchor-like configuration of tip 51 serves to firmly attach body hook 32 to the chicken body.

Half body 16 with leg 17 secured by leg retainer 11 can be packaged and shipped to a retailer. As will be appreciated by those skilled in the art, packaging is made easier because of the relative uniformity amongst the half bodies with secured legs. The consumer can remove the leg retainer prior to cooking of the half chicken or keep the retainer in place during cooking. Leg retainer 11 is easily visible after cooking and is removed by the consumer prior to eating the chicken.

Figure 7:
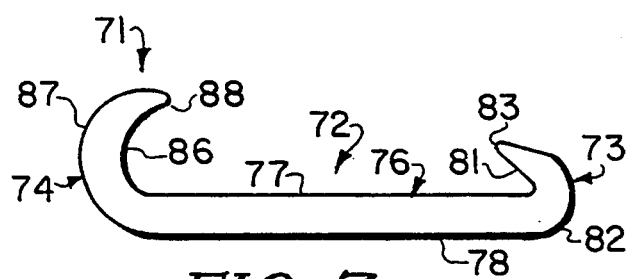
FIG. 7 is top plan view of another embodiment of the leg retainer of the present invention.
Figure 8:
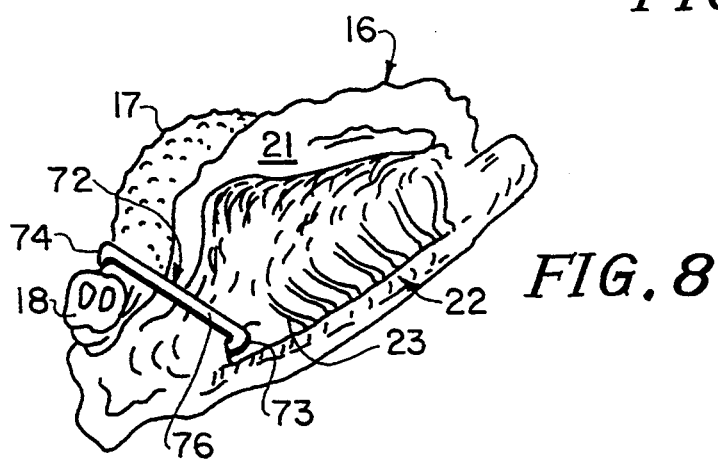
FIG. 8 is a side elevational view of the outside of a half of poultry with the leg retainer of FIG. 6 in position thereon.

The leg retainer of the present invention can have other embodiments and be within the scope of the present invention. For example, a leg retainer 71 which is similar in many respects to leg retainer 11 is illustrated in FIGS. 7 and 8. Longitudinally extending leg retainer 71 is formed from a substantially rigid coplanar thin plastic member 72 and includes first hook means or portion in the form of body hook 73 and second hook means or portion in the form of leg hook 74. A straight elongate connector 76 is joined at one end to body hook 73 and at the other end to leg hook 74 and is formed with opposite first or inner and second or outer sides 77 and 78. Body hook 73 is formed with an inner side 81 which extends away from connector inner side 77 at an acute angle of approximately 45° toward leg hook 74. Body hook 73 further includes an outer side 82 which curves from connector outer side 78 around the end of plastic member 31 before straightening to join inner side 81 of the body hook at pointed tip 83.

Leg hook 74 is formed from generally semi-circular inner and outer sides 86 and 87 which extend respectively from inner and outer sides 77 and 78 of connector 76 to meet at pointed tip 88. The leg hook is sized and shaped so as to fit relatively snugly around leg 17 of body half 16 below hock 18.

In operation and use, the installer hooks leg hook 74 around leg 17 before pulling the leg relatively tight up against outer side 26 of body half 16 and piercing meat 24 with body hook 73 so as to secure plastic member 72 to inner side 21 of the chicken. Tip 83 serves the purposes of tips 49 and 51 of leg retainer 11 to pierce meat 24 and secure plastic member 72 to the chicken. As can be seen, leg retainer 71 simply attaches to body half 16 and positions leg 17 close to the body half during shipping and handling of the half chicken.

Figure 9:
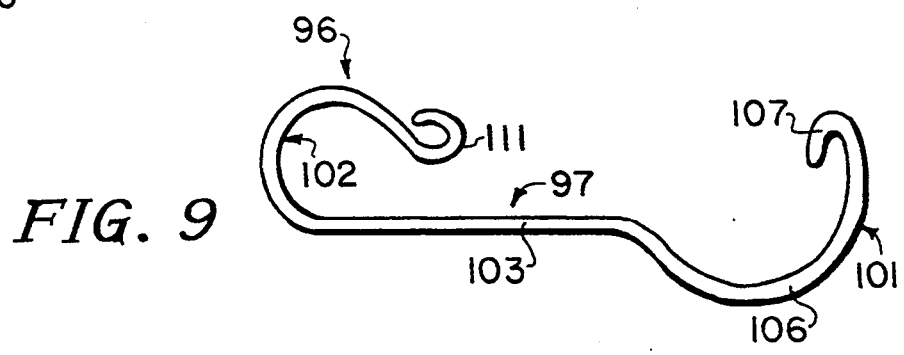
FIG. 9 is top plan view of another embodiment of the leg retainer of the present invention.

Another embodiment of the retainer of the present invention which is substantially similar to leg retainer 11 is illustrated in FIG. 9. Longitudinally extending leg retainer 96 is formed from a substantially coplanar thin member 97 made from any suitable material such as galvanized or stainless steel wire of 0.080 to 0.117 gauge. Although thin member 97 is substantially rigid, its wire construction permits it to bend or flex slightly. Leg retainer 96 includes first hook means or portion in the form of body hook 101 and second hook means or portion in the form of leg hook 102. A straight elongate connector 103 is joined at one end to body hook 101 and at the other end to leg hook 102.

Arcuately-extending body hook 101 has a shape which is similar to the outline of tab portion 61 and body hook 32 of leg retainer 11 and, more specifically, includes a tab portion 106 which extends from connector 103 in a first direction away from the longitudinal axis of thin member 97. The arc of body hook 102 continues around one end of thin member 97 to extend in a second opposite direction relative to the longitudinal axis. The end of body hook 102 curves back sharply on itself through an angle of approximately 180° to form hooking portion 107.

Leg hook 102 arcuately extends from the other end of connector 103 in the second direction away from the longitudinal axis of thin member 97 through an angle greater than 180° so as to bend back toward the connector. The end of leg hook 102 curves back sharply on itself in a direction away from connector 103 to form blunt end or bend 111. The leg hook is sized to fit relatively snugly around leg 17 of body half 16 below and adjacent hock 18.

In operation and use, leg retainer 96 is utilized to secure a leg 17 of a chicken body half 16 in substantially the same manner as leg retainer 11 discussed above. The installer grasps the leg retainer at tab portion 106 and hooks leg hook 102 around leg 17 of the chicken behind and adjacent hock 18. Blunt end 111 serves to minimize the catching of leg hook 102 on chicken leg 17. Blunt end 111 also causes the arc of leg hook 102 to expand slightly so as to permit placement of the leg hook about the chicken leg. Body hook 101 is secured to the chicken half in substantially the same manner as body hook 32. Hooking portion 107 permits body hook 101 to secure to bone structure 22 or meat 24 of the chicken and tab portion 106 facilitates pushing of the body hook when securing it to the chicken body.

It should be appreciated that the body hooks of retainers 11, 71 and 96 could secure to outer side 26 of the chicken and be within the scope of the present invention. In addition, the retainers can be sized to fit other poultry such as turkeys and be within the scope of the present invention.

It is apparent from the foregoing that a retainer for use with half of a body of eviscerated poultry to secure a leg to the half body during shipping and cooking has been provided. The retainer is suitable for use with small poultry such as chicken and can be easily attached to the leg of the chicken body behind the hock. The other end of the retainer attaches to either the meat or bone structure of the chicken.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, and to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A leg retainer for use with a half of a body of eviscerated chicken having a leg thereon with a hock, comprising a unitary substantially rigid thin elongate member having first and second opposite free ends, the thin elongate member including a first hook portion which attaches to the half of the body of eviscerated chicken, a second hook portion subtending an angle of at least 90° which hooks about the leg of the chicken and a connector for joining the first hook portion to the second hook portion, the first and second hook portions forming the first and second opposite free ends of the thin elongate member, whereby the thin elongate member serves to pull the leg close to the half of the body of eviscerated chicken.

2. A leg retainer as in claim 1 wherein the second hook portion has a size and shape for securing to the leg of the chicken behind the hock.

3. A leg retainer as in claim 2 wherein the second hook portion has an inside radius of approximately 0.3 inch.

4. A leg retainer as in claim 2 herein the second hook portion subtends an angle ranging from approximately 90° to 120°.

5. A leg retainer as in claim 1 wherein the first hook portion has a pointed end to facilitate its attachment to the body.

6. A leg retainer as in claim 5 wherein the first hook portion has a first pointed end for piercing the body and a second pointed end for retaining the first hook portion within the body.

7. A leg retainer as in claim 1 wherein the first hook portion has an inside formed from at least first and second straight surfaces which extend at an acute angle from each other.

8. A leg retainer as in claim 7 wherein the acute angle is approximately 55°.

9. A leg retainer as in claim 7 wherein the thin elongate member extends along a longitudinal axis and wherein the first straight surface extends at a right angle relative to the longitudinal axis.

10. A leg retainer as in claim 9 wherein the first straight surface has a length ranging from 0.25 to 0.50 inch.

11. A leg retainer as in claim 1 wherein the first and second hook portions extend from the connector in the same direction.

12. A leg retainer as in claim 11 wherein the thin elongate member further includes a tab portion for gripping which extends in an opposite direction from the first and second hook portions.

13. A leg retainer as in claim 12 wherein the tab portion includes opposite first and second planar surfaces and wherein at least one of said planar surfaces includes anti-slip means for facilitating gripping of the tab portion.

14. A leg retainer as in claim 1 wherein the thin elongate member is made from plastic.

15. A leg retainer as in claim 1 wherein the thin elongate member is made from wire.

16. A leg retainer for use with a half of a body of eviscerated fowl having a leg thereon with a hock, comprising a unitary substantially rigid thin elongate plastic member having first and second opposite free ends, the elongate plastic member including a first hook which attaches to the half of the body of eviscerated fowl and has a pointed end, an arcuately extending second hook subtending an angle of at least 90° which hooks about the leg of eviscerated fowl and is sized to extend around the leg behind the hock and an elongate connector for joining the first and second hooks, the first and second hooks extending from the connector in the same direction and forming the first and second opposite free ends of the elongate plastic member, whereby the elongate plastic member serves to pull the leg close to the half of the body of eviscerated fowl during shipping and/or cooking.

17. A leg retainer as in claim 16 wherein the elongate plastic member further includes a tab portion for gripping which extends in an opposite direction from the first and second hooks.

18. A poultry product ready for baking comprising a half of a body of eviscerated fowl having a leg thereon with a circumferential surface and a hock, a unitary substantially rigid thin elongate member for pulling the leg close to the half of the body of eviscerated fowl and having first and second opposite free ends, the thin elongate member including a first hook portion which attaches to the half of the body of eviscerated fowl, a second hook portion which hooks about the leg of the fowl and a connector for joining the first hook portion to the second hook portion, the second hook having an arcuate inner surface which generally corresponds to the circumferential surface of the leg and has an angle sufficient to hook about the leg and retain the leg close to the half of the body of eviscerated fowl, the first and second hook portions forming the first and second opposite free ends of the thin elongate member.

19. A poultry product as in claim 18 wherein the first and second hook portions of the thin elongate member extend from the connector in the same direction.

* * * * *